United States Patent
Huntley et al.

(10) Patent No.: US 12,320,639 B2
(45) Date of Patent: Jun. 3, 2025

(54) METHOD AND APPARATUS FOR MEASURING DISTANCE

(71) Applicant: LOUGHBOROUGH UNIVERSITY, Leicestershire (GB)

(72) Inventors: Jonathan Huntley, Leicestershire (GB); Christos Pallikarakis, Leicestershire (GB); Pablo Ruiz, Leicestershire (GB)

(73) Assignee: LOUGHBOROUGH UNIVERSITY, Leicestershire (GB)

( * ) Notice: Subject to any disclaimer, the term of this patent is extended or adjusted under 35 U.S.C. 154(b) by 127 days.

(21) Appl. No.: 17/926,314

(22) PCT Filed: May 13, 2021

(86) PCT No.: PCT/GB2021/051148
§ 371 (c)(1),
(2) Date: Nov. 18, 2022

(87) PCT Pub. No.: WO2021/234347
PCT Pub. Date: Nov. 25, 2021

(65) Prior Publication Data
US 2023/0213326 A1  Jul. 6, 2023

(30) Foreign Application Priority Data

May 18, 2020 (GR) .............................. 20200100260
Jun. 25, 2020 (GB) .................................... 2009723

(51) Int. Cl.
*G01B 9/02004* (2022.01)
*G01B 9/02001* (2022.01)
(Continued)

(52) U.S. Cl.
CPC ..... *G01B 9/02004* (2013.01); *G01B 9/02009* (2013.01); *G01B 9/02091* (2013.01); *G01N 21/47* (2013.01)

(58) Field of Classification Search
CPC ............ G01B 2290/70; G01B 9/02004; G01B 9/02009; G01B 9/02028; G01B 9/02072; G01B 9/02091; G01N 21/47
See application file for complete search history.

(56) References Cited

U.S. PATENT DOCUMENTS

| 6,678,441 | B1 * | 1/2004 | Taylor | ................ G02B 6/12007 |
| | | | | 356/519 |
| 2010/0290032 | A1 * | 11/2010 | Bugge | ................... G01N 21/85 |
| | | | | 356/337 |

(Continued)

FOREIGN PATENT DOCUMENTS

| DE | 102009053006 A1 | 5/2011 |
| WO | 0198731 A1 | 12/2001 |
| WO | 2018055606 A1 | 3/2018 |

OTHER PUBLICATIONS

International Search Report from corresponding GB Application No. 2009723.4, mailed on Mar. 31, 2021.

(Continued)

*Primary Examiner* — Hina F Ayub
(74) *Attorney, Agent, or Firm* — Tucker Ellis LLP

(57) ABSTRACT

An interferometry apparatus comprising: a laser source operable to emit a first light beam; a beam splitter arranged to split the first light beam into an object beam and a reference beam, the object beam passing along an object beam arm and the reference beam passing along a reference beam arm; an adaptive delay line located a distance along the reference beam arm, the adaptive delay line being configured to provide, in use, one or more length-adjusted reference beams; a beam splitter arranged to recombine the object beam from the object beam arm and the length-adjusted reference beam(s) from the reference beam arm;

(Continued)

and a photodetector operable to detect interference between the object beam and the length-adjusted reference beam(s).

22 Claims, 12 Drawing Sheets

(51) Int. Cl.
*G01B 9/02091* (2022.01)
*G01N 21/47* (2006.01)

(56) References Cited

U.S. PATENT DOCUMENTS

| | | |
|---|---|---|
| 2014/0139846 A1 | 5/2014 | Jensen |
| 2017/0052016 A1* | 2/2017 | Sancho Durá ..... G01B 9/02091 |
| 2017/0131083 A1* | 5/2017 | Han .................... A61B 5/0066 |
| 2017/0343791 A1 | 11/2017 | Swanson |
| 2019/0078870 A1* | 3/2019 | Engel ................. G01B 9/02019 |
| 2021/0356249 A1 | 11/2021 | Swanson |

OTHER PUBLICATIONS

International Search Report and Written Opinion from corresponding PCT Application No. PCT/GB2021/051148, mailed on Jul. 21, 2021.

K. Takiguchi, et al., "Integrated-optic variable delay line and its application to a low-coherence reflectometer", Optical Society of America, Oct. 2005, vol. 30, No. 20, pp. 2739-2741.

* cited by examiner

METHOD AND APPARATUS FOR MEASURING DISTANCE

RELATED APPLICATION DATA

This application is a national phase application of International Application No. PCT/GB2021/051148 filed May 13, 2021, published in the English language, and which claims priority to application number GR 20200100260 filed on May 18, 2020 and application number GB 2009723.4 filed Jun. 25, 2020. The entireties of the aforementioned applications are incorporated herein by reference.

BACKGROUND

The present disclosure relates to an apparatus, e.g. an interferometry apparatus, for measuring distance. The disclosure also relates to methods for measuring distance, including methods using an apparatus disclosed herein.

Optical techniques for absolute distance measurement have been developed in many branches of science and engineering. Those based on a tunable laser source find applications over length scales from the sub-mm in the form of swept source Optical Coherence Tomography (OCT), to tens of metres or more with Frequency Scanning Interferometry (FSI), also commonly termed Frequency Modulated Continuous Wave (FMCW) lidar.

Such techniques involve combining the light reflected or scattered from a target, which may be termed an object beam, with a local reference wave, which may be termed a reference beam. Interference between the object beam and the reference beam may be detected. The object beam and the reference beam are split out from an initial beam from a laser source. There is an optical path difference between the distance travelled by the object beam and the reference beam.

A problem is that the application of Frequency Scanning Interferometry to long-range (~10 m), high-speed (upwards of $10^5$ coordinates per second) absolute distance measurement is currently impractical at reasonable cost, due to the extremely high modulation frequencies (typically 100 GHz or more).

SUMMARY

A first aspect provides an interferometry apparatus comprising:
- a laser source operable to emit a first light beam;
- a beam splitter arranged to split the first light beam into an object beam and a reference beam, the object beam passing along an object beam arm and the reference beam passing along a reference beam arm;
- an adaptive delay line located a distance along the reference beam arm, the adaptive delay line being configured to provide, in use, one or more length-adjusted reference beams;
- a beam splitter arranged to recombine the object beam from the object beam arm and the length-adjusted reference beam(s) from the reference beam arm; and
- a photodetector operable to detect interference between the object beam and the length-adjusted reference beam(s).

By providing one or more length-adjusted reference beams, an optical path difference between the object beam and the reference beam(s) may be adjusted, as compared with an apparatus in which there is no adaptive delay line. In particular, the optical path difference between the object beam and the reference beam(s) may be reduced. For example, the frequency of the interference signal may be reduced when measuring distance to a distant target, e.g. a target located 1 metre or more from the apparatus, by adjusting the optical path distance of the reference beam(s) to nearly match the optical path distance of the object beam.

The adaptive delay line may comprise a series of N switches, where $N \geq 1$, to allow the selection of one of $2^N$ spaced optical path lengths, and a combiner, whereby the adaptive delay line operates, in use, to provide a length-adjusted reference beam.

The $2^N$ spaced optical path lengths may be equally or unequally spaced.

The adaptive delay line may comprise any number of switches. The adaptive delay line may comprise a plurality of switches. The adaptive delay line may comprise up to or at least 100 switches, up to or at least 50 switches, up to or at least 20 switches or up to or at least 10 switches. For example, the adaptive delay line may comprise one, two, three, four, five, six, seven, eight, nine or ten switches.

Each switch in the adaptive delay line may comprise a rotating half-wave plate and a polarising beam splitter.

One or more of the optical path lengths selectable by operation of the switch(es) within the adaptive delay line may be adjustable in length.

The optical path length selectable by operation of each one of the switches within the adaptive delay line may be unique. In other words, the optical path length selectable by operation of a given one of the switches within the adaptive delay line may be different from the optical path length selectable by any of the other switches within the adaptive delay line.

In an example implementation, the adaptive delay line may be configured such that the reference beam or the object beam passes through a series of N switchable delay lines, with exponentially-growing delays.

The adaptive delay line may comprise a series of N dividers, to provide simultaneously $2^N$ reference beams with spaced optical path lengths, where $N \geq 1$, and a combiner, whereby the adaptive delay line operates, in use, to provide a plurality of length-adjusted reference beams.

The $2^N$ spaced optical path lengths may be equally or unequally spaced.

The adaptive delay line may comprise any number of dividers. The adaptive delay line may comprise a plurality of dividers. The adaptive delay line may comprise up to or at least 100 dividers, up to or at least 50 dividers, up to or at least 20 dividers or up to or at least 10 dividers. For example, the adaptive delay line may comprise one, two, three, four, five, six, seven, eight, nine or ten dividers.

The adaptive delay line may comprise one or more etalons, whereby the adaptive delay line operates, in use, to provide a plurality of length-adjusted reference beams The or each etalon may have any suitable free spectral range.

One or more of the beam splitters may comprise a half-wave plate and a polarising beam splitter or a 50:50 beam splitter. Any given beam splitter may have any suitable split ratio, e.g. 90:10, 80:20, 70:30, 60:40, 50:50, 40:60, 30:70, 20:80 or 10:90.

The beam splitter arranged to split the first light beam into an object beam and a reference beam and the beam splitter arranged to recombine the object beam and the adapted reference beam may be the same beam splitter.

The beam splitter arranged to split the first light beam into an object beam and a reference beam and the beam splitter arranged to recombine the object beam and the adapted reference beam may be different beam splitters.

In an example implementation, the apparatus may include: a first beam splitter arranged to split the first light beam into an object beam and a reference beam; a second beam splitter located a distance along the object beam arm, the second beam splitter being arranged to split a target-incident beam from the object beam; and a third beam splitter arranged to recombine the object beam and the adapted reference beam.

The laser source may be a tunable laser source. The laser source may be a VCSEL laser or an FDML laser.

The apparatus may comprise a data logger operable to receive and log data from the photodetector. The data logger may comprise a data acquisition board (DAQ). The DAQ may have a sampling rate of no more than 100 giga samples per second (GS s$^{-1}$), up to 50 GS s$^{-1}$, up to 20 GS s$^{-1}$, up to 10 GS s$^{-1}$, up to 5 GS s$^{-1}$, up to 2 GS s$^{-1}$ or up to 1 GSs$^{-1}$.

The target may comprise any suitably reflective surface. Suitable targets may, for example, be metallic, polymeric, or made of composite materials. They may have optically smooth or optically rough surface finishes. The target may alternatively comprise a weakly-scattering medium, such as biological tissues.

The target may be at any distance from the apparatus.

The apparatus may comprise a data processing device arranged to receive data from the data logger and to process and/or analyse the received data.

The inclusion of an adaptive delay line in the reference beam arm of the interferometry apparatus may make the interferometry apparatus particularly well suited for high-speed and/or long-range absolute distance measurements.

The interferometry apparatus may be a frequency scanning interferometer. A frequency scanning interferometer according to the present disclosure may be particularly well suited for long-range, absolute distance measurements.

The interferometry apparatus may be a swept source Optical Coherence Tomography apparatus. A swept source Optical Coherence Tomography apparatus is typically used to measure shorter distances, e.g. of the order of millimetres, for imaging biological tissues such as eye retina and skin cancers. The sweep rates in a swept source Optical Coherence Tomography apparatus are so high that the teaching of the present disclosure may be beneficially applied to such an apparatus.

A second aspect provides an interferometry apparatus comprising:
  a laser source operable to emit a first light beam;
  a beam splitter arranged to split the first light beam into an object beam and a reference beam, the object beam passing along an object beam arm and the reference beam passing along a reference beam arm;
  an adaptive delay line located a distance along the object beam arm, the adaptive delay line being configured to provide, in use, one or more length-adjusted object beams;
  a beam splitter arranged to recombine the length-adjusted object beam(s) from the object beam arm and the reference beams from the reference beam arm; and
  a photodetector operable to detect interference between the length-adjusted object beam(s) and the reference beam.

By providing one or more length-adjusted object beams, an optical path difference between the object beam(s) and the reference beams may be adjusted, as compared with an apparatus in which there is no adaptive delay line. In particular, the optical path difference between the object beam(s) and the reference beams may be reduced. For example, the frequency of the interference signal may be reduced when measuring distance to a distant target, e.g. a target located 1 metre or more from the apparatus, by adjusting the optical path distance of the object beam(s) to nearly match the optical path distance of the reference beam.

The adaptive delay line may comprise a series of N switches, where N≥1, to allow the selection of one of $2^N$ spaced optical path lengths, and a combiner, whereby the adaptive delay line operates, in use, to provide a length-adjusted object beam.

The $2^N$ spaced optical path lengths may be equally or unequally spaced.

The adaptive delay line may comprise any number of switches. The adaptive delay line may comprise a plurality of switches. The adaptive delay line may comprise up to or at least 100 switches, up to or at least 50 switches, up to or at least 20 switches or up to or at least 10 switches. For example, the adaptive delay line may comprise one, two, three, four, five, six, seven, eight, nine or ten switches.

Each switch in the adaptive delay line may comprise a rotating half-wave plate and a polarising beam splitter.

One or more of the optical path lengths selectable by operation of the switch(es) within the adaptive delay line may be adjustable in length.

The optical path length selectable by operation of each one of the switches within the adaptive delay line may be unique. In other words, the optical path length selectable by operation of a given one of the switches within the adaptive delay line may be different from the optical path length selectable by any of the other switches within the adaptive delay line.

The adaptive delay line may comprise a series of N dividers, to provide simultaneously $2^N$ object beams with spaced optical path lengths, where N≥1, and a combiner, whereby the adaptive delay line operates, in use, to provide a plurality of length-adjusted object beams.

The $2^N$ spaced optical path lengths may be equally or unequally spaced.

The adaptive delay line may comprise any number of dividers. The adaptive delay line may comprise a plurality of dividers. The adaptive delay line may comprise up to or at least 100 dividers, up to or at least 50 dividers, up to or at least 20 dividers or up to or at least 10 dividers. For example, the adaptive delay line may comprise one, two, three, four, five, six, seven, eight, nine or ten dividers.

The adaptive delay line may comprise one or more etalons, whereby the adaptive delay line operates, in use, to provide a plurality of length-adjusted object beams The or each etalon may have any suitable free spectral range.

One or more of the beam splitters may comprise a half-wave plate and a polarising beam splitter or a 50:50 beam splitter. Any given beam splitter may have any suitable split ratio, e.g. 90:10, 80:20, 70:30, 60:40, 50:50, 40:60, 30:70, 20:80 or 10:90.

The beam splitter arranged to split the first light beam into an object beam and a reference beam and the beam splitter arranged to recombine the object beam and the adapted reference beam may be the same beam splitter.

The beam splitter arranged to split the first light beam into an object beam and a reference beam and the beam splitter arranged to recombine the object beam and the adapted reference beam may be different beam splitters.

In an example implementation, the apparatus may include: a first beam splitter arranged to split the first light beam into an object beam and a reference beam; a second beam splitter located a distance along the object beam arm, the second beam splitter being arranged to split a target-incident beam from the object beam; and a third beam splitter arranged to recombine the object beam and the adapted reference beam.

The laser source may be a tunable laser source. The laser source may be a VCSEL laser or an FDML laser.

The apparatus may comprise a data logger operable to receive and log data from the photodetector. The data logger may comprise a data acquisition board (DAQ). The DAQ may have a sampling rate of no more than 100 GS $s^{-1}$, up to 50 GS $s^{-1}$, up to 20 GS $s^{-1}$, up to 10 GS $s^{-1}$, up to 5 GS $s^{-1}$, up to 2 GS $s^{-1}$ or up to 1 GS $s^{-1}$.

The target may comprise any suitably reflective surface. Suitable targets may, for example, be metallic, polymeric, or made of composite materials. They may have optically smooth or optically rough surface finishes. The target may alternatively comprise a weakly-scattering medium, such as biological tissues.

The target may be any distance from the apparatus.

The apparatus may comprise a data processing device arranged to receive data from the data logger and to process and/or analyse the received data.

The inclusion of an adaptive delay line in the reference beam arm of the interferometry apparatus may make the interferometry apparatus particularly well suited for high-speed and/or long-range absolute distance measurements.

The interferometry apparatus may be a frequency scanning interferometer. A frequency scanning interferometer according to the present disclosure may be particularly well suited for long-range, absolute distance measurements.

The interferometry apparatus may be a swept source Optical Coherence Tomography apparatus. A swept source Optical Coherence Tomography apparatus is typically used to measure shorter distances, e.g. of the order of millimetres, for imaging biological tissues such as eye retina and skin cancers. The sweep rates in a swept source Optical Coherence Tomography apparatus are so high that the teaching of the present disclosure may be beneficially applied to such an apparatus.

A third aspect provides an adaptive delay line module adapted for installation in a reference beam arm of an interferometry apparatus, wherein the adaptive delay line module comprises an adaptive delay line configured to provide, in use, one or more length-adjusted reference beams.

The adaptive delay line may comprise a series of N switches, where N≥1, to allow the selection of one of $2^N$ spaced optical path lengths, and a combiner, whereby the adaptive delay line operates, in use, to provide a length-adjusted reference beam.

The $2^N$ spaced optical path lengths may be equally or unequally spaced.

The adaptive delay line may comprise any number of switches. The adaptive delay line may comprise a plurality of switches. The adaptive delay line may comprise up to or at least 100 switches, up to or at least 50 switches, up to or at least 20 switches or up to or at least 10 switches. For example, the adaptive delay line may comprise one, two, three, four, five, six, seven, eight, nine or ten switches.

Each switch in the adaptive delay line may comprise a rotating half-wave plate and a polarising beam splitter.

One or more of the optical path lengths selectable by operation of the switch(es) within the adaptive delay line may be adjustable in length.

The optical path length selectable by operation of each one of the switches within the adaptive delay line may be unique. In other words, the optical path length selectable by operation of a given one of the switches within the adaptive delay line may be different from the optical path length selectable by any of the other switches within the adaptive delay line.

The adaptive delay line may comprise a series of N dividers, to provide simultaneously $2^N$ reference beams with spaced optical path lengths, where N≥1, and a combiner, whereby the adaptive delay line operates, in use, to provide a plurality of length-adjusted reference beams.

The $2^N$ spaced optical path lengths may be equally or unequally spaced.

The adaptive delay line may comprise any number of dividers. The adaptive delay line may comprise a plurality of dividers. The adaptive delay line may comprise up to or at least 100 dividers, up to or at least 50 dividers, up to or at least 20 dividers or up to or at least 10 dividers. For example, the adaptive delay line may comprise one, two, three, four, five, six, seven, eight, nine or ten dividers.

The adaptive delay line may comprise one or more etalons, whereby the adaptive delay line operates, in use, to provide a plurality of length-adjusted reference beams The or each etalon may have any suitable free spectral range.

A fourth aspect provides an adaptive delay line module adapted for installation in an object beam arm of an interferometry apparatus, wherein the adaptive delay line module comprises an adaptive delay line configured to provide, in use, one or more length-adjusted object beams.

The adaptive delay line may comprise a series of N switches, where N≥1, to allow the selection of one of $2^N$ spaced optical path lengths, and a combiner, whereby the adaptive delay line operates, in use, to provide a length-adjusted object beam.

The $2^N$ spaced optical path lengths may be equally or unequally spaced.

The adaptive delay line may comprise any number of switches. The adaptive delay line may comprise a plurality of switches. The adaptive delay line may comprise up to or at least 100 switches, up to or at least 50 switches, up to or at least 20 switches or up to or at least 10 switches. For example, the adaptive delay line may comprise one, two, three, four, five, six, seven, eight, nine or ten switches.

Each switch in the adaptive delay line may comprise a rotating half-wave plate and a polarising beam splitter.

One or more of the optical path lengths selectable by operation of the switch(es) within the adaptive delay line may be adjustable in length.

The optical path length selectable by operation of each one of the switches within the adaptive delay line may be unique. In other words, the optical path length selectable by operation of a given one of the switches within the adaptive delay line may be different from the optical path length selectable by any of the other switches within the adaptive delay line.

The adaptive delay line may comprise a series of N dividers, to provide simultaneously $2^N$ reference beams with spaced optical path lengths, where N≥1, and a combiner, whereby the adaptive delay line operates, in use, to provide a plurality of length-adjusted object beams.

The $2^N$ spaced optical path lengths may be equally or unequally spaced.

The adaptive delay line may comprise any number of dividers. The adaptive delay line may comprise a plurality of dividers. The adaptive delay line may comprise up to or at least 100 dividers, up to or at least 50 dividers, up to or at least 20 dividers or up to or at least 10 dividers. For example, the adaptive delay line may comprise one, two, three, four, five, six, seven, eight, nine or ten dividers.

The adaptive delay line may comprise one or more etalons, whereby the adaptive delay line operates, in use, to provide a plurality of length-adjusted object beams The or each etalon may have any suitable free spectral range.

The interferometry apparatus of any embodiment described herein may be provided at least in part on or in a chip or a photonic integrated circuit. The adaptive delay line, or the adaptive delay line module, may be provided on or in a chip or a photonic integrated circuit.

A fifth aspect provides use of an interferometry apparatus according to the first aspect or the second aspect to measure absolute distance to a target or absolute distances to structures within a weakly-scattering target.

The target may be located any distance from the apparatus.

The target may be located 1 metre or more, 5 metres or more, 10 metres or more or 20 metres or more from the apparatus.

The target may be located less than 5 metres, less than 1 metre, less than 10 cm or less than 1 cm from the apparatus.

A sixth aspect provides a method of measuring distance using an interferometry apparatus comprising:
operating a laser to provide a first light beam;
splitting the first light beam into an object beam and a reference beam, the object beam passing along an object beam arm of the interferometry apparatus and the reference beam passing along a reference beam arm of the interferometry apparatus;
providing an adaptive delay line located a distance along the reference beam arm, the adaptive delay line being configured to provide one or more length-adjusted reference beams, thereby adjusting an optical path difference in the interferometry apparatus;
recombining the object beam from the object beam arm and the length-adjusted reference beam(s) from the reference beam arm; and
detecting interference between the object beam and the length-adjusted reference beam(s).

A seventh aspect provides a method of measuring distance using an interferometry apparatus comprising:
operating a laser to provide a first light beam;
splitting the first light beam into an object beam and a reference beam, the object beam passing along an object beam arm of the interferometry apparatus and the reference beam passing along a reference beam arm of the interferometry apparatus;
providing an adaptive delay line located a distance along the object beam arm, the adaptive delay line being configured to provide one or more length-adjusted object beams, thereby adjusting an optical path difference in the interferometry apparatus;
recombining the length-adjusted object beam(s) from the object beam arm and the reference beam from the reference beam arm; and
detecting interference between the length adjusted object beam(s) and the reference beam.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Example embodiments will be described with reference to the accompanying drawings, in which:

FIG. 5b shows filtered signals from FIG. 5a;

DETAILED DESCRIPTION

Figure 1:
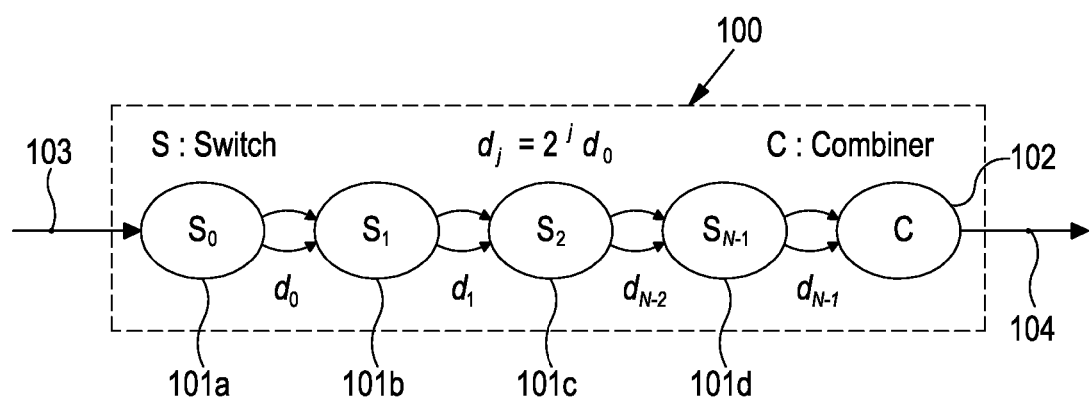
FIG. 1 is a block diagram of an adaptive delay line for a reference beam arm or an object beam arm of an interferometry apparatus.

The teaching of the present disclosure may apply to measuring distances over any range.

As used herein, the term long-range when used in relation to distance measurements may be understood to refer to distances of the order of 10 metres or more.

As used herein, the term high-speed when used in relation to distance measurements may be understood to refer to speeds of $10^5$ coordinates per second or more.

The application of Frequency Scanning Interferometry to long-range (~10 m), high-speed (upwards of $10^5$ coordinates $s^{-1}$) absolute distance measurement is currently impractical at reasonable cost, due to the extremely high modulation frequencies (typically 100 GHz or more).

The present disclosure provides a solution based on an adaptive delay line (ADL) architecture, in which the reference beam passes through a series of N switchable delay lines, with exponentially-growing delays. The benefits include a reduction by a factor of $2^N$ in the required signal sampling rate, in the size of dataset to be processed, and in minimum allowable source coherence length, thus paving the way for the use of fast sweeping lasers such as vertical cavity surface emitting lasers (VCSEL) and Fourier domain mode locked (FDML) lasers for long range lidars. The validity of the principle has been demonstrated experimentally by means of a three-switch prototype.

Interferometry techniques such as frequency scanning interferometry (FSI) and optical coherence tomography (OCT) involve combining the light reflected or scattered from a target with a local reference wave. The mixing of the light reflected or scattered from the target surface, or from within the target in the case of weakly-scattering materials, with the local reference wave at a photodetector results in an electrical signal at a frequency f that is proportional to Λ, the optical path difference, between the two waves, i.e. (i) the reflected or scattered wave; and (ii) the local reference wave. For a linear frequency ramp and non-dispersive medium, f is given by:

$$f = \Lambda f_s (\Delta \lambda / \lambda_c^2) \qquad \text{Equation 1}$$

where $f_s$ is the laser sweep rate or scan repetition rate, $\Delta\lambda$ is the tuning range and $\lambda_c$ is the centre wavelength for that $\Delta\lambda$. The resolution of Λ varies inversely with $\Delta\lambda$.

Current state of the art tunable laser sources such as vertical-cavity surface-emitting lasers (VCSELs) and Fourier-domain mode-locking lasers (FDMLs) can produce sweep rates of 100 s of kHz to several MHz, respectively, combined with $\Delta\lambda$ values exceeding 100 nm at $\lambda_c$=1.0, 1.3, or 1.5 µm. Since each sweep provides the data for one coordinate, and the large $\Delta\lambda$ can measure surface location to sub-µm resolution, such sources therefore open-up the possibility of high-accuracy, long-range distance measurement at rates in the range $10^5$-$10^6$ s$^{-1}$. These rates offer significant potential for industrial applications such as dimensional quality control on production lines, automated assembly and robotic path guidance and are 2-3 orders of magnitude higher than current commercial FSI-based instruments.

However, there are at least four significant challenges that need to be overcome. The first is the extremely high sampling rates required of the data acquisition board (DAQ). For example, with $\Delta\lambda$=100 nm, $\lambda_c$=1.3 µm, $f_s$=100 kHz, Equation 1 shows that f~12 GHz at a distance z of 1 m (Λ=2 z=2 m in air for coaxial illumination and observation directions), and an order of magnitude higher still for a 10 m range.

Minimum sampling rates are twice these values, giving rise to DAQ hardware sampling rate requirements in the range 10 s to 100 s of GS s$^{-1}$. Currently, such hardware costs rise very rapidly above about 1 GS s$^{-1}$.

Secondly, processing in real-time such high-speed data streams is non-trivial.

Thirdly, the coherence length of these laser sources is not well characterized and may pose limitations for long Λ.

Finally, Fourier domain peak broadening and splitting due to imperfect frequency ramps increases in severity with increasing Λ.

The present disclosure may mitigate or solve one or more of these challenges.

In particular, a solution to one or more of these problems may be based on the concept of a so-called adaptive delay line (ADL). The ADL is introduced into the reference beam arm or the object beam arm and can reduce Λ to the point at which the modulation frequency drops to levels that can be dealt with by standard DAQs (~1 GS s$^{-1}$) whilst simultaneously reducing data throughput, removing the need for a long coherence length source, and reducing Fourier domain peak broadening effects.

FIG. 1 is a block diagram illustrating generally an adaptive delay line 100, which may be installed within a reference beam arm or an object beam arm of an interferometry apparatus according to the disclosure.

The adaptive delay line 100 includes N switches arranged in optical series. The N switches allow the selection of one of $2^N$ equally spaced optical path lengths. In FIG. 1, four switches 101a, 101b, 101c, 101d are shown. The first switch 101a may be termed $S_0$. The second switch 101b may be termed $S_1$. The third switch 101c may be termed $S_2$. The fourth switch 101d represents generally the final switch in a series of N switches and generally may be termed $S_{N-1}$. After the final switch in the series, i.e. after switch $S_{N-1}$, there is a combiner (C) 102. During operation, a reference beam or an object beam 103 enters the adaptive delay line 100, passes through the switches 101a, 101b, 101c, 101d and the combiner 102, whereupon a length-adjusted reference beam or a length-adjusted object beam 104 exits the adaptive delay line 100.

Each switch 101a, 101b, 101c, 101d may be mechanically, optically or electronically controlled. Each switch 101a, 101b, 101c, 101d is operable to select one of two optical paths to the next switch (or the combiner 102 in the case of the final switch in the series).

At the combiner 102, the last two paths are recombined to form the length-adjusted reference beam or length-adjusted object beam 104. The length-adjusted reference beam or length-adjusted object beam proceeds onwards through the interferometry apparatus and subsequently interferes with an object beam or a reference beam, respectively.

The general operating principle of an adaptive delay line, e.g. the adaptive delay line 100, will now be described with reference to FIG. 1. The reference beam or object beam passes through N optical switches $S_0, S_1, \ldots, S_{N-1}$ in series. Each switch, which may be mechanically, optically or electronically controlled, selects one of the two optical paths to the next switch. At the final stage, the last two paths are recombined and the length-adjusted reference beam or length-adjusted object beam proceeds to the rest of the interferometer where it interferes with the object beam or the reference beam, respectively.

The state of the $j^{th}$ switch may be specified by a single bit, $b_j$ with 1 indicating that the longer path is selected, and 0 the shorter. By choosing the path length difference between two possible paths for the successive switches to follow an exponential sequence, i.e. $d_j = 2^j d_0$ where $d_j$ is the path difference for the two paths between the $j^{th}$ switch and the $(j+1)^{th}$ switch and $d_0$ is the path difference for the first switch, a single Λ from a set of $2^N$ discrete and spaced, e.g. uniformly spaced, Λs with a step length of $d_0$ can be selected.

Take for example the case N=10 and $d_0$=10 mm. The resulting 1024 steps defined by the bit pattern B=$b_{N-1} b_{N-2} \ldots b_1 b_0$ through which the imbalance between the reference and the object arms can be adjusted, cover the range 0 to ~10 m whilst the maximum required sampling frequency is reduced by 1024×, to that for a Λ of 10 mm. As a specific example, for a target with Λ=8.003 m, the byte B=1100100000 shifts the zero-Λ surface to 8.000 m while the remaining 3 mm are detected at a correspondingly much lower frequency. In general, for a given data acquisition (DAQ) hardware, each additional switch in the chain doubles either the maximum range or the coordinate acquisition rate. The restriction on the source coherence length ($l_c \geq 2^N d_0$), which places an ultimate upper limit on measurement range, is relaxed by a factor $2^N$ to $l_c \geq d_0$.

An adaptive delay line disclosed herein may be well-suited for use in absolute distance measurement, in particular with a swept monochromatic laser source.

Figure 2:
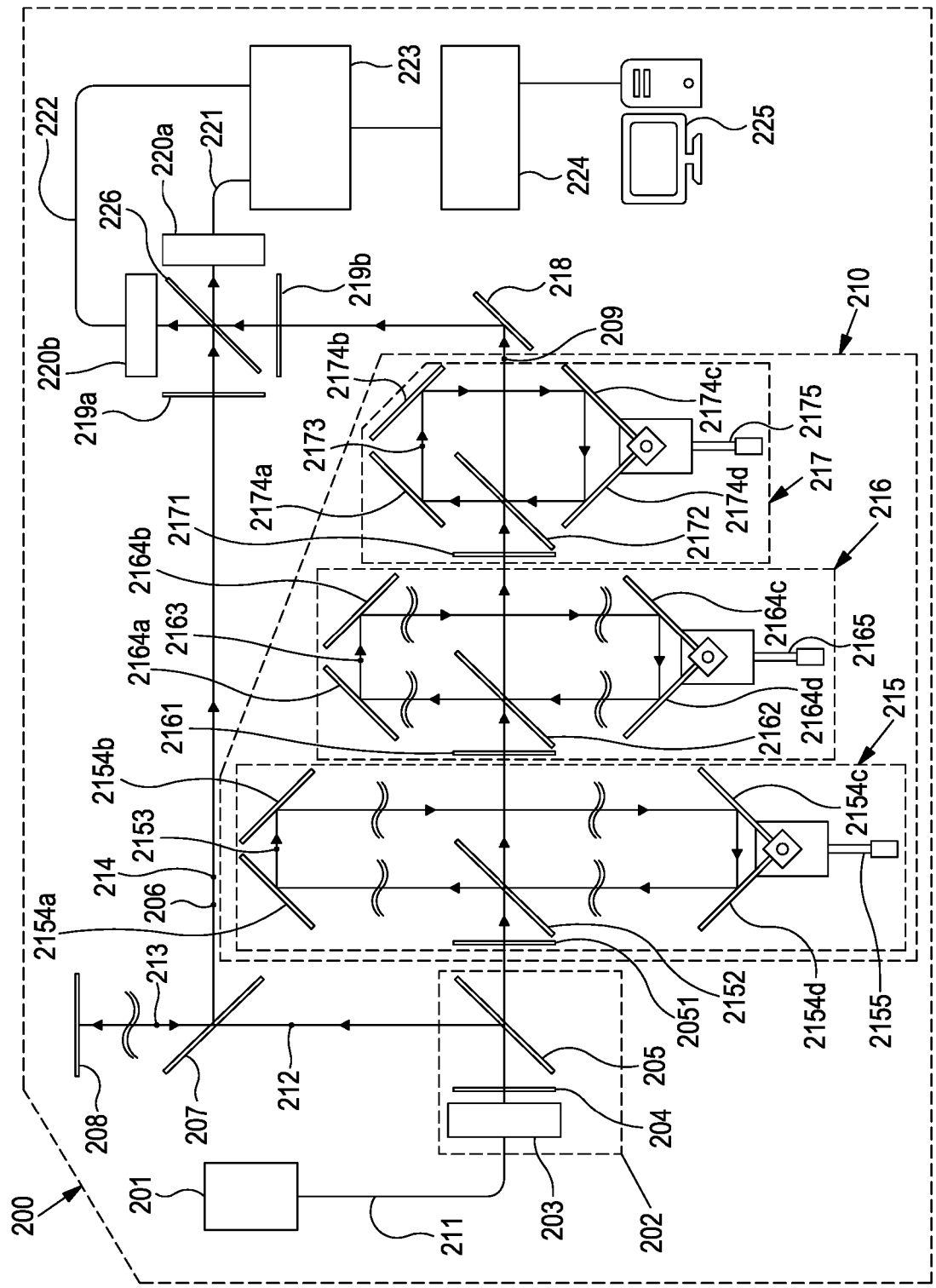
FIG. 2 illustrates an example of an interferometry apparatus.

FIG. 2 illustrates an interferometry apparatus 200 for measuring distance. The apparatus 200 is a proof-of-principle experimental optical setup.

The apparatus 200 comprises a tunable laser source 201. The tunable laser source 201 is a swept monochromatic laser source. In the proof-of-principle experimental optical setup, the tunable laser source used was a SANTEC TSL-510 with Δλ=100 nm, $l_c$~1.8 to 300 m, and $\lambda_c$=1300 nm, operated in free running mode with output power limited to 1 mW.

The laser source 201 is in optical communication via a fibre optic cable 211 with a first beam splitter 202. The fibre optic cable 211 is a single-mode, polarization-maintaining (SM-PM) fibre. The first beam splitter 202 comprises, in optical series, a reflective collimator 203, a half-wave plate 204 and a polarizing beam splitter 205. The polarizing beam splitter 205 operates to split an incoming light beam from the laser source 201 into an object beam 212 and a reference beam. The object beam 212 passes along an object beam arm 206. The reference beam passes along a reference beam arm 209.

The object beam arm 206 comprises a 50:50 beam splitter 207. The 50:50 beam splitter 207 is arranged to split a target incident beam 213 from the object beam 212, the target incident beam 212 being reflected by a target 208 back towards the 50:50 beam splitter 207, where part of the target incident beam 213 is reflected from the beam splitter 207 to form an object beam 214 that travels onwards along the object beam arm 206.

In the proof-of-principle experimental optical setup, the target 208 comprises a gold mirror. The distance from the 50:50 beam splitter 207 to the target 208 may be adjustable. In the proof-of-principle experimental optical setup, the target 208 was mounted on a rail assembly (not shown) that allowed manual movement of the target 208 over a range of approximately 1 metre.

In the proof-of-principle experimental optical setup, the reference beam arm 209 comprises an adaptive delay line 210. The adaptive delay line 210 is a three-bit adaptive delay line.

The adaptive delay line 210 comprises three switches arranged in optical series, i.e. a first switch 215, a second switch 216 and a third switch 217.

The first switch 215 comprises an achromatic half-wave plate 2151 arranged in front of a polarizing beam splitter 2152. In use, mechanical switching is performed by rotation of the achromatic half-wave plate 2151 relative to the polarizing beam splitter 2152.

The first switch 215 can selectively split the reference beam to divert a split-off reference beam around a first loop 2153 having a loop optical path length. The first loop 2153 comprises four mirrors 2154a, 2154b, 2154c, 2154d arranged to reflect the diverted reference beam such that having travelled around the first loop 2153, the diverted reference beam enters the polarizing beam splitter 2152 at a side opposite the side that the diverted reference beam left the polarizing beam splitter 2152. The third 2154c and fourth 2154d of the four mirrors 2154a, 2154b, 2154c, 2154d are mounted on a translation stage 2155 to allow for adjustment of the loop optical path length.

The second switch 216 comprises an achromatic half-wave plate 2161 arranged in front of a polarizing beam splitter 2162. In use, mechanical switching is performed by rotation of the achromatic half-wave plate 2161 relative to the polarizing beam splitter 2162.

The second switch 216 can selectively split the reference beam to divert a split-off reference beam around a second loop 2163 having a loop optical path length. The second loop 2163 comprises four mirrors 2164a, 2164b, 2164c, 2164d arranged to reflect the diverted reference beam such that having travelled around the second loop 2163, the diverted reference beam enters the polarizing beam splitter 2162 at a side opposite the side that the diverted reference beam left the polarizing beam splitter 2162. The third 2164c and fourth 2164d of the four mirrors 2164a, 2164b, 2164c, 2164d are mounted on a translation stage 2165 to allow for adjustment of the loop optical path length.

The third switch 217 comprises an achromatic half-wave plate 2171 arranged in front of a polarizing beam splitter 2172. In use, mechanical switching is performed by rotation of the achromatic half-wave plate 2171 relative to the polarizing beam splitter 2172.

The third switch 217 can selectively split the reference beam to divert a split-off reference beam around a third loop 2173 having a loop optical path length. The third loop 2173 comprises four mirrors 2174a, 2174b, 2174c, 2174d arranged to reflect the diverted reference beam such that having travelled around the third loop 2173, the diverted reference beam enters the polarizing beam splitter 2172 at a side opposite the side that the diverted reference beam left the polarizing beam splitter 2172. The third 2174c and fourth 2174d of the four mirrors 2174a, 2174b, 2174c, 2174d are mounted on a translation stage 2175 to allow for adjustment of the loop optical path length.

After the adaptive delay line 210, a mirror 218 is arranged to reflect a length-adapted reference beam 227 towards a 50:50 beam splitter 226. The object beam 214 and the length-adapted reference beam 227 enter the 50:50 beam splitter 226 in mutually perpendicular directions.

Before entering the 50:50 beam splitter 226, the object beam 214 passes through a first linear polarizer 219a. Before entering the 50:50 beam splitter 226, the length-adapted reference beam 227 passes through a second linear polarizer 219b. A first coupler 220a is arranged on the opposite side of the 50:50 beam splitter 226 from the first linear polarizer 219a. A second coupler 220b is arranged on the opposite side of the 50:50 beam splitter 226 from the second linear polarizer 219b.

An optical fibre 221 takes light from the first coupler 220a to an autobalanced photodetector 223. Another optical fibre 222 takes light from the second coupler 220b to the autobalanced photodetector 223. Each of the optical fibres 221, 222 is a single-mode, polarization-maintaining (SM PM) fibre.

The first linear polarizer 219a and the second linear polarizer 219b ensure interference between matching states of polarization occurs at the autobalanced photodetector 223. This interference between matching states of polarization is detected, in use, by the autobalanced photodetector 223.

A data logger 224 is operably connected to the autobalanced photodetector 223. The data logger may comprise a storage oscilloscope. In the proof-of-principle experimental optical setup, the data logger was a storage oscilloscope (Tektronix MSO54, 500 MHz, 6.25 GS s$^{-1}$).

A computer 225 is operably connected to the data logger 224. The computer 225 is arranged to process and/or analyse data logged on the data logger.

To test the concept, proof-of-principle experiments were carried out using the optical setup illustrated in FIG. 2. As described above, this apparatus 200 incorporates a 3-bit adaptive delay line 210 with mechanical switching performed by rotation of achromatic half-wave plates in front of polarizing beam splitters. If the incoming state of polarization to a given half-wave plate is horizontal (S), the beam passes straight through the polarizing beam splitter to the next switch. Rotation of the half-wave plate by 45° causes a 90° rotation in state of polarization (P), thereby directing the beam round the loop formed by two pairs of beam-folding gold mirrors (2154a-d; 2164a-d; 2174a-d). The translation stages 2155, 2165, 2175 allow fine adjustment of the delay lengths, which took, for example, the values $d_0 \sim 240$ mm, $d_1 \sim 490$ mm, $d_3 \sim 830$ mm.

The half-wave plate 204 and polarizing beam splitter 205 prior to the adaptive delay line 210 act as a variable ratio beam splitter 202.

The tunable laser source 201 used was a SANTEC TSL-510 with $\Delta\lambda = 100$ nm, $l_c \sim 1.8$ to 300 m, and $\lambda_c = 1300$ nm, operated in free running mode with output power limited to 1 mW. The light beam is delivered to the interferometer by means of a single-mode, polarization-maintaining (SM PM) fibre 211 and is subsequently collimated using the reflective collimator 203 prior to being split into the reference beam and the object beam 212.

The two linear polarizers 219a, 219b situated on either side of the 50:50 beam splitter 226 ensure interference between matching states of polarization is detected at the autobalanced photodetector 223. Light is delivered to the autobalanced photodetector 223 by means of the pair of single-mode, polarization-maintaining fibres 221, 222. A signal from the autobalanced photodetector 223 is then digitized by a storage oscilloscope (Tektronix MSO54, 500 MHz, 6.25 GS s$^{-1}$), i.e. the data logger 224. The data sequences captured, are transferred to the computer 225 for subsequent processing. Synchronization is achieved by triggering the oscilloscope with the laser transistor-transistor-logic (TTL) output at the start of each scan.

Figure 3:
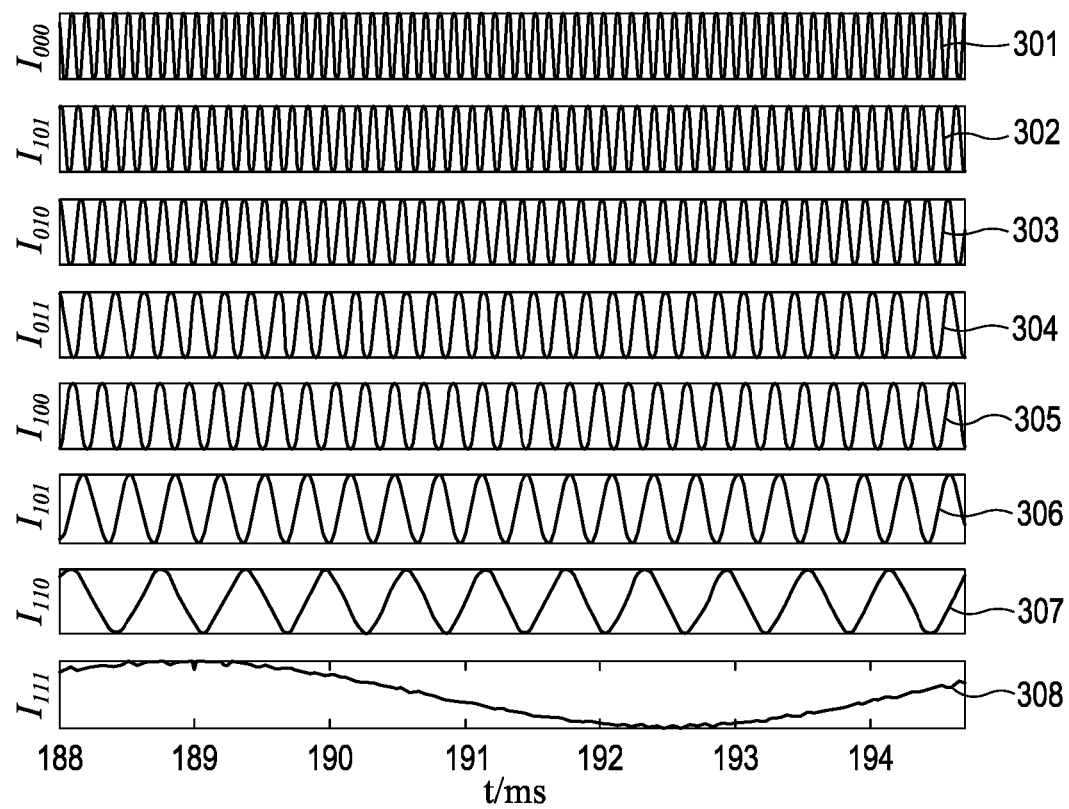
FIG. 3 shows normalized time signals corresponding to eight adaptive delay line bit configurations for a target at approximately 825 mm from the object beam splitter.

FIG. 3 shows normalized intensity signals, measured as a function of time (t), corresponding to the eight adaptive delay line bit configurations for a target at ~825 mm from the beam splitter 207.

To illustrate the ability of the system to down-shift the interference signal frequency (f), the target 208 was placed a few tens of mm beyond the maximum delay length of the 3-bit adaptive delay line 210 (~780 mm), achieved with the 111 bit-configuration. The laser sweep parameters were: $\Delta\lambda = 10$ nm, starting wavelength $\lambda_1 = 1330$ nm and average tuning rate=10 nm s$^{-1}$, while the sample size was set to $1.25 \times 10^6$ points. Of these, 9000 points were processed corresponding to a $\Delta\lambda < 1$ nm. The reduced bandwidth was used to minimize the errors in z, owing to the combined effect of dispersion and fluctuations in tuning rate over the full $\Delta\lambda$ ranges, and which would otherwise be impossible to decouple without proper wavelength referencing and linearization techniques.

The interference intensity signals I(t) over a ~7 ms scan sub-section for all eight bit patterns are shown in FIG. 3. A first interference signal 301 is shown for a first bit pattern 000. A second interference signal 302 is shown for a second bit pattern 001. A third interference signal 303 is shown for a third bit pattern 010. A fourth interference signal 304 is shown for a fourth bit pattern 011. A fifth interference signal 305 is shown for fifth bit pattern 100. A sixth interference signal 306 is shown for a sixth bit pattern 101. A seventh interference signal 307 is shown for a seventh bit pattern 110. An eighth interference signal 308 is shown for an eighth bit pattern 111.

As FIG. 3 illustrates, there is a gradual reduction in frequency as the path length imbalance between the reference beam and object beam arms is reduced through selection of the eight different bit-configurations, with the 111 bit-configuration giving the lowest frequency as expected.

Figure 4:
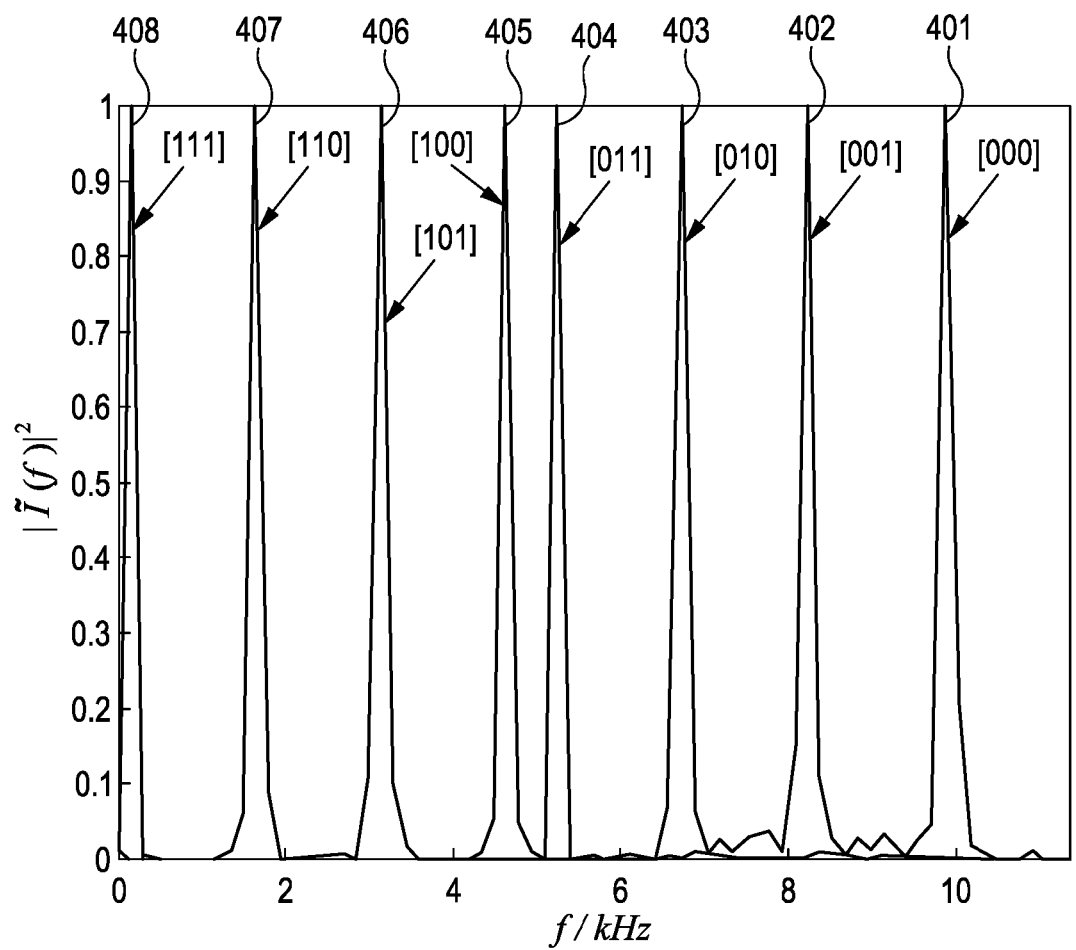
FIG. 4 illustrates Fourier transforms of the eight signals shown in FIG. 3.

The Fourier transforms of the eight signals are shown in FIG. 4. A first peak 401 is the Fourier transform of the first interference signal 301. A second peak 402 is the Fourier transform of the second interference signal 302. A third peak 403 is the Fourier transform of the third interference signal 303. A fourth peak 404 is the Fourier transform of the fourth interference signal 304. A fifth peak 405 is the Fourier transform of the fifth interference signal 305. A sixth peak 406 is the Fourier transform of the sixth interference signal 306. A seventh peak 407 is the Fourier transform of the seventh interference signal 307. An eighth peak 408 is the Fourier transform of the eighth interference signal 308. The frequency for each peak location was estimated to sub-pixel resolution by means of a Newton-Raphson iterative procedure, giving values 9.89, 8.21, 6.73, 5.23, 4.84, 3.13, 1.67 and 0.13 kHz for the 000 through to 111 bit configurations (i.e. for the first interference signal 301, the second interference signal 302, the third interference signal 303, the fourth interference signal 304, the fifth interference signal 305, the sixth interference signal 306, the seventh interference signal 307 and the eighth interference signal 308), respectively.

The question of how to select the correct bit pattern, i.e. the one that minimizes $\Lambda$ and hence f, may now arise. Consider first the general case where the object, whose range is to be measured, lies at some arbitrary point within the measurement volume. Each bit pattern can be applied to the ADL in turn. For sources with short coherence length, the highest signal modulation will occur for the bit pattern with the shortest $\Lambda$. In the case of a source with long $l_c$, a low pass filter (LPF) can be introduced at the output of the photodetector, or indeed by choosing a photodetector with a low bandwidth. Only the shortest $\Lambda$ bit-configurations will then produce significant signal, and this will be within the Nyquist limit for the data acquisition hardware, provided $d_0$ has been chosen to be sufficiently small. All $2^N$ configurations could be explored during a single frequency sweep, followed by the detailed $\Lambda$ measurement at the selected fixed bit-configuration on the subsequent sweep. For example, for the case N=10 and a sweep rate of $10^5$ Hz, switching events should take place every 10 ns ($1/2^N f_s$), which is within the capabilities of fibre switches. For the less demanding case of a quasi-continuous surface, the search can be accelerated by only exploring bit-patterns near to the one established for the previous measurement, with the system slowing down only in the presence of a large z-discontinuity. Alternatively, a low-cost time-of-flight LADAR working in parallel with the FSI could be used to determine the integer part of z, and thus instruct the adaptive delay line, which tackles the more demanding precision part of the measurement.

There may remain, however, one additional source of ambiguity: how to distinguish between positive and negative deviations in $\Lambda$ from the zero-$\Lambda$ surface that gives the lowest modulation frequency. In the earlier example, the target at z=8.003 m would produce the same signal frequency as the case with the target at z=7.997 m. This ambiguity could be resolved by incorporating phase information (e.g. through quadrature, sometimes called I/Q detection), since the frequencies of the Fourier domain peaks would then have opposite signs for the two cases. When I/Q detection is not available, modulation frequencies measured with one or both of the two neighbouring bit configurations will allow the ambiguity to be overcome. For example, suppose $B_v$ is the bit configuration that minimizes the modulation frequency, denoted here $f_{B_v}$. $B_{v-1}$ and $B_{v+1}$ are the bit configurations that select the nearest neighbouring zero-$\Lambda$ surfaces. Assuming identical $\Lambda$ between pairs of zero-$\Lambda$ surfaces, the sign $s_v$ of $f_{B_v}$ can be recovered as:

$$s_v = (f_{B_{v-1}} - f_{B_{v+1}}) / |f_{B_{v-1}} - f_{B_{v+1}}| \qquad \text{Equation 2}$$

Figure 5A:
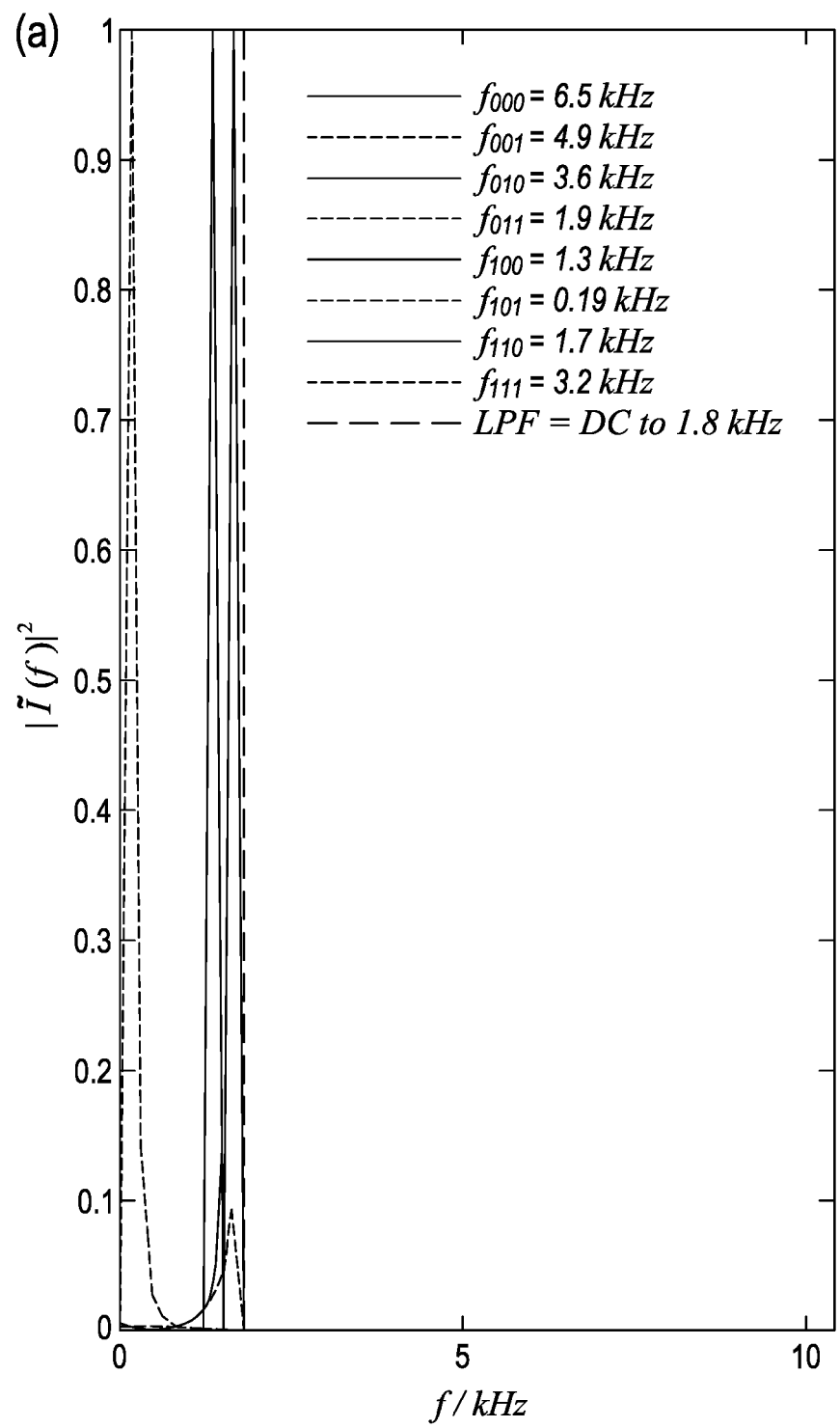
FIG. 5a shows detected frequencies in the presence of a low pass filter with a cut-off frequency at 1.8 kHz.
Figure 5B:
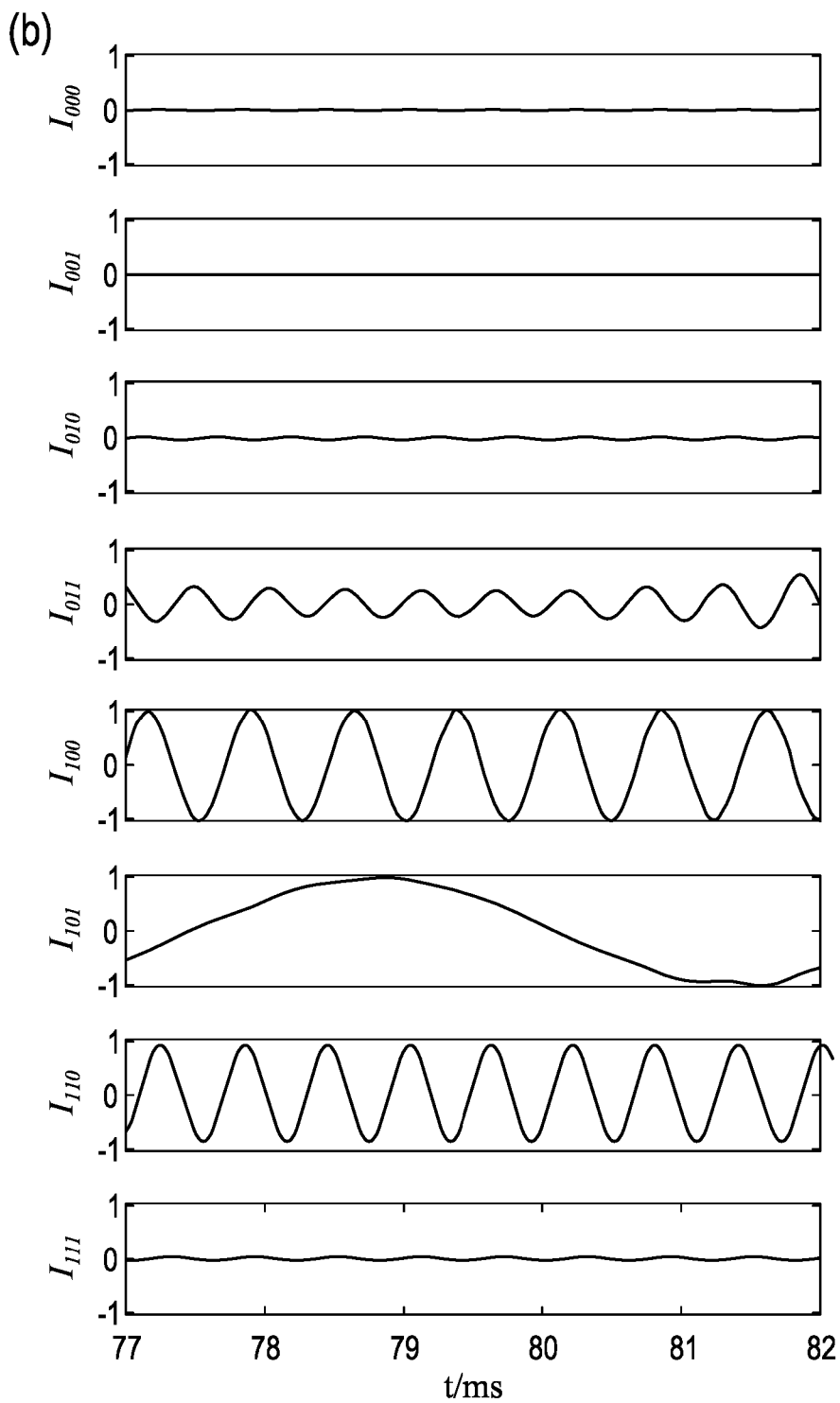

To illustrate the above, an experiment was performed in which the target 208 was placed at an arbitrary location within the measurement volume while the signals corresponding to the eight delays were recorded. Although a high speed version would require an analogue low pass filter (LPF) before sampling, in this demonstration the low speed frequency ramp allowed the method to be implemented by means of post-sampling digital LPF—applied here by multiplying the Fourier spectra by a 1.8-kHz-wide top-hat window before inverse transformation. After filtering, only three significant Fourier peaks remain as shown in FIG. 5a, which correspond to the three adjacent bit-configurations 100, 101 and 110 that have the largest signal amplitude (FIG. 5b). Substituting the frequencies of these peaks ($f_{100}=1.3$ kHz, $f_{101}=0.19$ kHz and $f_{110}=1.7$ kHz) into Equation 2 gives $s_{101}=-1$, indicating that the target 208 was lying closer to the Λ-surface for the lower bit configuration (100) than that for the higher (110) one.

As with any frequency scanning interferometry system, calibration is required to convert the measured modulation frequency to distance. There is, however, an additional step for an N-bit ADL-based frequency scanning interferometry system, namely determining the N-additional delay lengths, or equivalently the frequency shifts introduced by those delays. The latter approach was adopted here: with the target 208 fixed a few mm beyond the 111 zero-Λ surface, eight signals corresponding to the eight bit-configurations of the adaptive delay line 210 were recorded and their frequencies calculated using the method described earlier.

$$\overbrace{\begin{bmatrix} 1 & 0 & 0 & 0 \\ 1 & 1 & 0 & 0 \\ 1 & 0 & 1 & 0 \\ 1 & 1 & 1 & 0 \\ 1 & 0 & 0 & 1 \\ 1 & 1 & 0 & 1 \\ 1 & 0 & 1 & 1 \\ \underline{1} & \underline{1} & \underline{1} & \underline{1} \\ 000 & 001 & 010 & 100 \end{bmatrix}}^{A} \times \overbrace{\begin{pmatrix} X_0 \\ X_1 \\ X_2 \\ X_3 \end{pmatrix}}^{X} = \overbrace{\begin{bmatrix} f_{000} \\ f_{001} \\ f_{010} \\ f_{011} \\ f_{100} \\ f_{101} \\ f_{110} \\ f_{111} \end{bmatrix}}^{F} \quad \text{Equation 3}$$

Figure 6A:
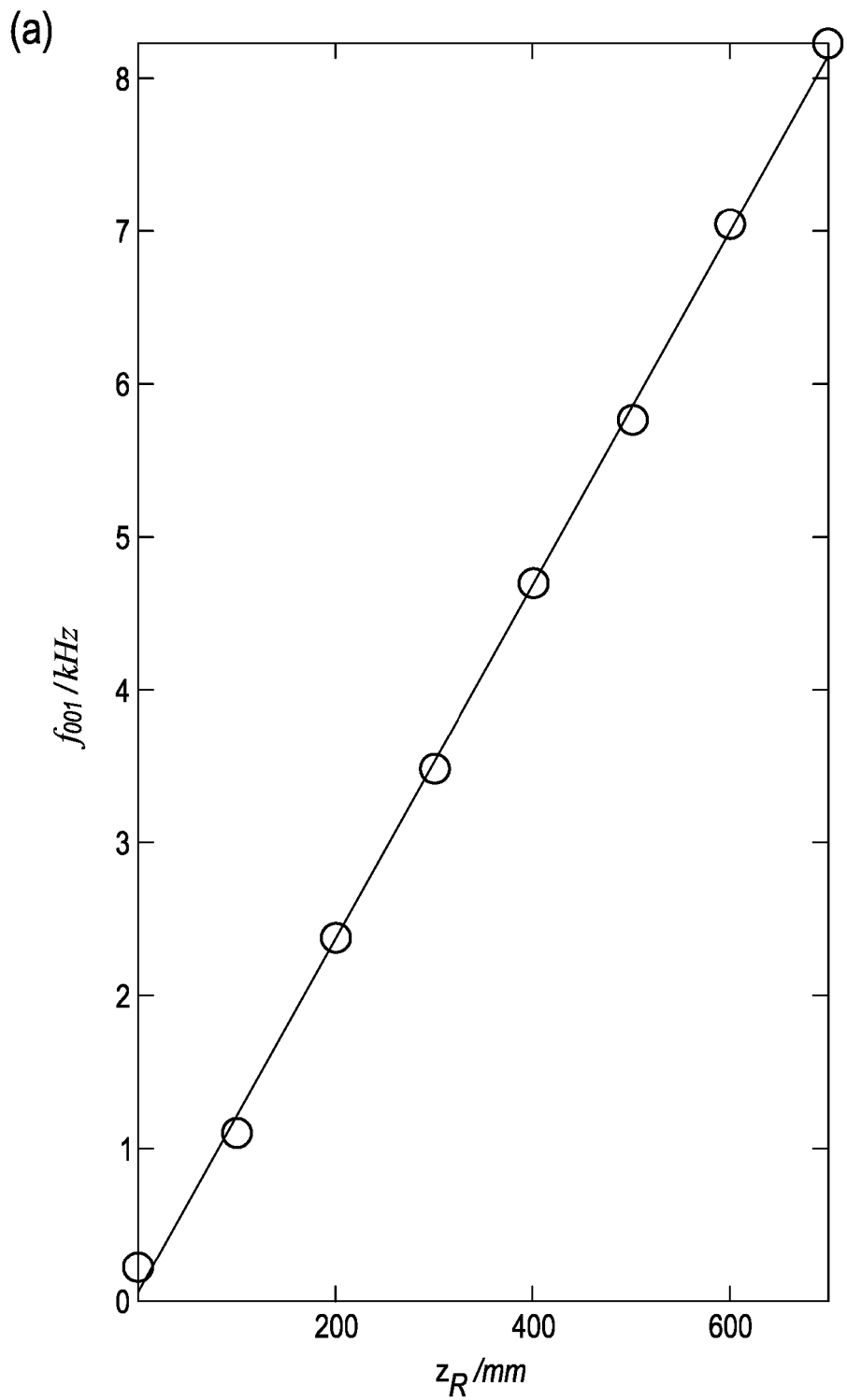
FIG. 6a shows a least-squares fit for frequency to distance conversion.

This gives rise to an overdetermined linear system of eight equations shown in matrix form in Equation 3. A is an 8×4 matrix whose rows denote the bit patterns active for each of the eight scans. The columns correspond to the four main delays that are active (1) or inactive (0), while F is the column vector containing the measured frequencies. Solving Eqn. (3) in a least squares sense for the column vector X gives four frequency values that are proportional to the physical lengths of the four main delays. The final stage of calibration—i.e., determination of the scaling constant linking frequency to Λ—could be done in several ways, for example through the absorption lines of a gas cell or reference cavity of known length. For the current setup a frequency stabilized reference interferometer (Renishaw XL-80) was introduced to measure the target location in parallel with the frequency scanning interferometry (FSI) system (i.e. the interferometry apparatus 200). A single delay (in this case the 001 was selected and the target 208 was moved to eight distinct locations. By performing a least squares straight-line fit to the measured frequencies versus known distance data, $z_R$, the conversion factor can be extracted from the gradient of the best-fit line as shown in FIG. 6a. This was calculated to be 0.01157 kHz mm$^{-1}$ with an RMS residual of 0.09516 kHz. The latter, whilst high for FSI systems, arose from the temporal variation in scan rate for the particular laser used and was still sufficiently low to demonstrate the principle of the proposed method.

Figure 6B:
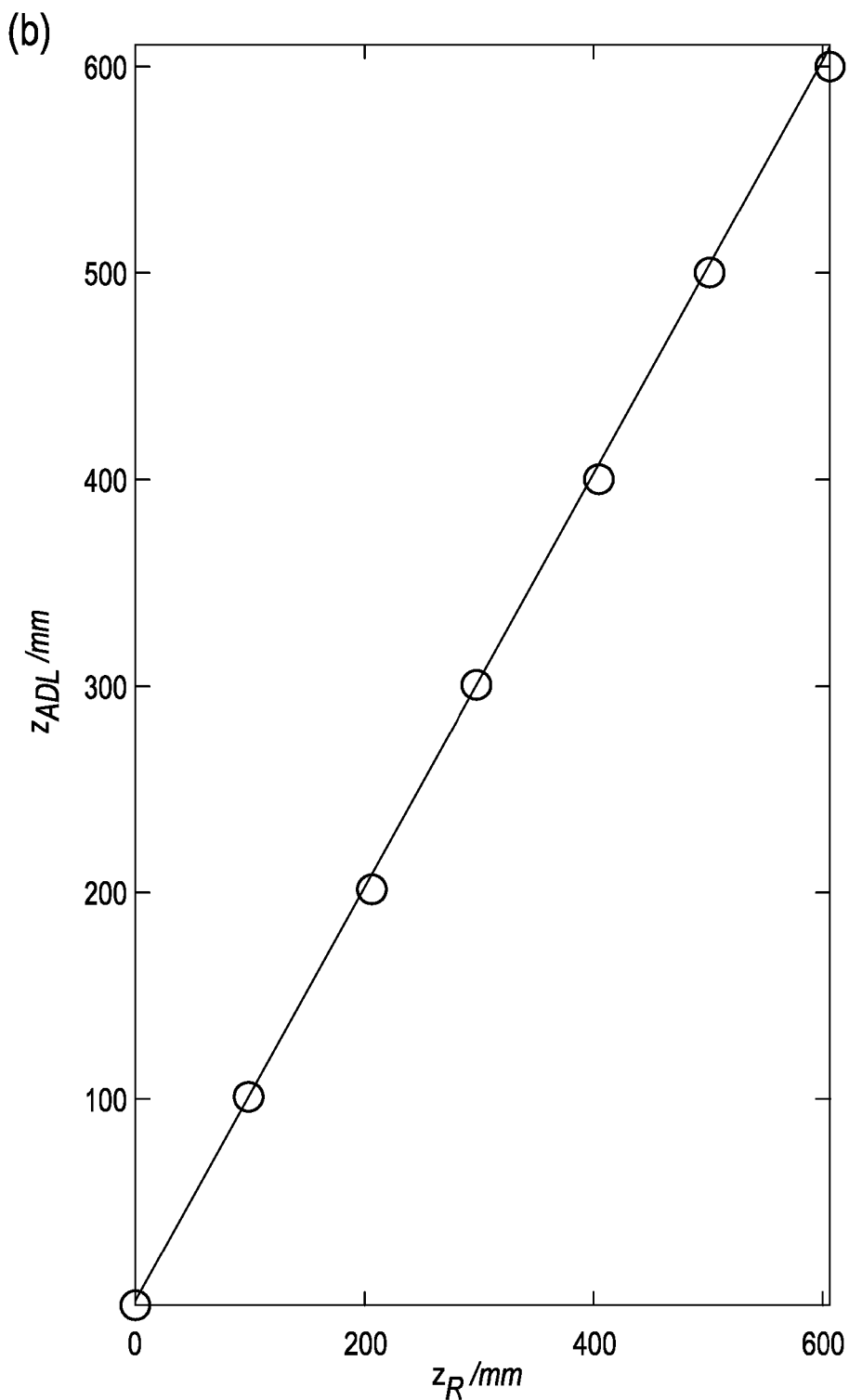
FIG. 6b shows a comparison of range measured by an interferometry apparatus according to an embodiment of the disclosure and a frequency-stabilized reference interferometer, with superimposed best straight-line fit.

As final validation of the method and data processing procedures described above, one further experiment was carried out to compare distances measured using the interferometry apparatus 200 of FIG. 2 with distances measured by the Renishaw interferometer. A new set of measurements was taken with the target 208 placed in a set of six locations that were independent of those used for calibration. A graph of range measured by the interferometry apparatus 200 versus that measured by the Renishaw interferometer is shown in FIG. 6b. The graph in 6b has a superimposed best straight-line fit, which has a gradient of 1.00536±0.01458, demonstrating (within experimental error) the expected 1:1 correspondence between the two systems. The RMS residual about the best-fit line was 3.00 mm.

The use of an adaptive delay line as disclosed herein may allow frequency scanning interferometry to be used for very high coordinate measurement rates (upwards of $10^5$ s$^{-1}$), over long ranges (tens of m), with standard data acquisition hardware (maximum sampling rate ~1 GS s$^{-1}$). The optical system comprises an adaptive delay line including a series of N switchable delay lines with exponentially-growing delays.

Benefits provided by the teaching of the present disclosure may include a reduction by a factor of $2^N$ in data acquisition rate, dataset size and minimum allowable source coherence length. The validity of the principle has been demonstrated by means of a low-speed 3-bit prototype.

It will be appreciated that the apparatus shown in FIG. 2 is simply an example of an apparatus embodying the teaching of the present disclosure. Various modifications will be apparent to the person skilled in the art without departing from the scope of the invention.

For instance, the laser source may be a VCSEL laser or an FDML laser.

The adaptive delay line may comprise any number of switches. The adaptive delay line may comprise a plurality of switches. The adaptive delay line may comprise up to or at least 100 switches, up to or at least 50 switches, up to or at least 20 switches or up to or at least 10 switches. For example, the adaptive delay line may comprise one, two, three, four, five, six, seven, eight, nine or ten switches.

One or more of the switches in the adaptive delay line may comprise, for example, a half-wave plate and a polarising beam splitter.

The adaptive delay line may employ other types of switch, which could be mechanically-controllable and/or electrically-controllable and/or magnetically-controllable and/or optically-controllable.

For example, one or more of the switches in the adaptive delay line may comprise an electrically-controllable switch. The electrically-controllable switch may comprise a Pockels cell and a polarising beam splitter. One or more of the switches in the adaptive delay line may employ a micro-electro-mechanical system (MEMS).

One or more of the optical path lengths selectable by operation of the switch(es) within the adaptive delay line may be adjustable in length.

The data logger may comprise a data acquisition board (DAQ). The DAQ may have a sampling rate of no more than 100 GS s$^{-1}$, up to 50 GS s$^{-1}$, up to 20 GS s$^{-1}$, up to 10 GS s$^{-1}$, up to 5 GS s$^{-1}$, up to 2 GS s$^{-1}$ or up to 1 GS s$^{-1}$.

An adaptive delay line, in which each switch is mechanically, optically or electronically controlled (e.g. as in the interferometry apparatus 200), may be termed an active adaptive delay line.

In other embodiments, the adaptive delay line may constitute a so-called passive adaptive delay line.

Figure 7:
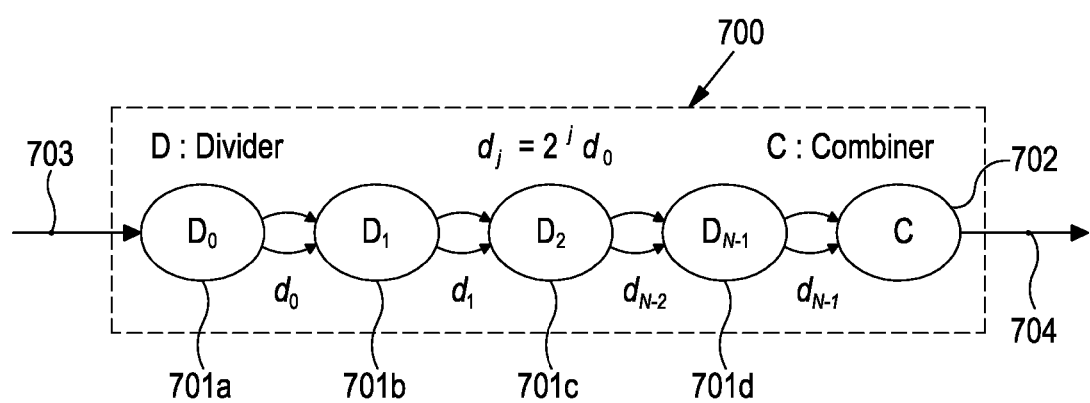
FIG. 7 is a block diagram of another example of an adaptive delay line for a reference beam arm or an object beam arm of an interferometry apparatus.

FIG. 7 is a block diagram illustrating generally an adaptive delay line 700, which may be installed within a reference beam arm or an object beam arm of an interferometry apparatus according to the disclosure.

The adaptive delay line 700 includes N dividers arranged in optical series. The N dividers provide $2^N$ spaced optical path lengths. In FIG. 7, four dividers 701a, 701b, 701c, 701d are shown. The first divider 701a may be termed $D_0$. The second divider 701b may be termed $D_1$. The third divider 701c may be termed $D_2$. The fourth divider 701d represents generally the final divider in a series of N dividers and generally may be termed $D_{N-1}$. After the final divider in the series, i.e. after divider $D_{N-1}$, there is a combiner (C) 702. During operation, a reference beam 703 enters the adaptive delay line 700, passes through the dividers 701a, 701b, 701c, 701d and the combiner 702, whereupon a plurality of length-adjusted reference beams 704 exit the adaptive delay line 700.

Figure 8:
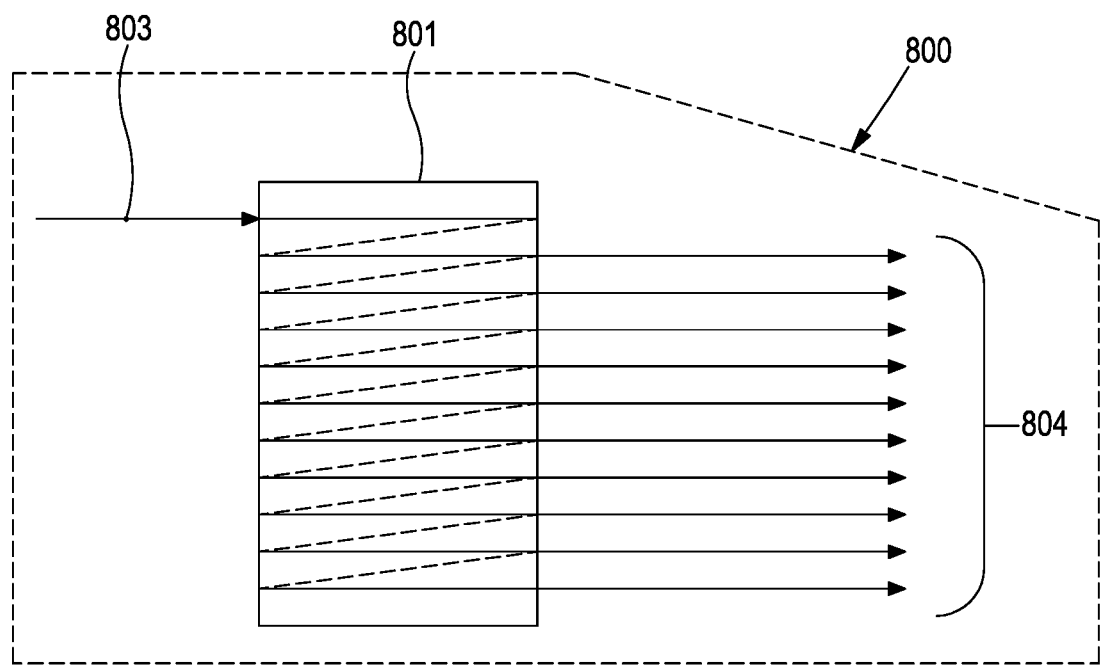
FIG. 8 is a block diagram of another example of an adaptive delay line for a reference beam arm or an object beam arm of an interferometry apparatus.

FIG. 8 is a block diagram illustrating generally an adaptive delay line 800, which may be installed within a reference beam arm or an object beam arm of an interferometry apparatus according to the disclosure.

The adaptive delay line 800 includes an etalon 801. During operation, a reference beam 803 enters the etalon 801, which splits the reference beam 803 into a plurality of length-adjusted reference beams 804. A passive adaptive delay line including an etalon may offer improved traceability, since the length scale is determined by the etalon spacing.

Use of a passive adaptive delay line (e.g. the adaptive delay line 700 or the adaptive delay line 800) may enable the simultaneous tracking of multiple targets.

In comparison with an active adaptive delay line, a passive adaptive delay line may have a relatively simple optical configuration. Also, a passive adaptive delay line does not require any active switching to be carried out during operation.

One or more adaptive delay lines may be provided in a module that may be integrated into an existing optical system for measuring distance, e.g. a frequency scanning interferometry system, a frequency modulated continuous wave Lidar system, a Ladar system, or an optical coherence tomography (OCT) system.

While the principles underlying the invention have been demonstrated using bulk optics, it is envisaged that the interferometry apparatus may be provided at least in part on or in a chip or a photonic integrated circuit. In particular, the adaptive delay line(s) may be provided on or in a chip or a photonic integrated circuit.

For example, it is envisaged that by using current standard manufacturing technology for telecommunications devices the adaptive delay line (or adaptive delay line module) may be provided on a chip.

The teaching of the present disclosure may be applied to many types of interferometry apparatus, including, for example, a Mach-Zehnder interferometer or a Michelson interferometer.

Figure 9:
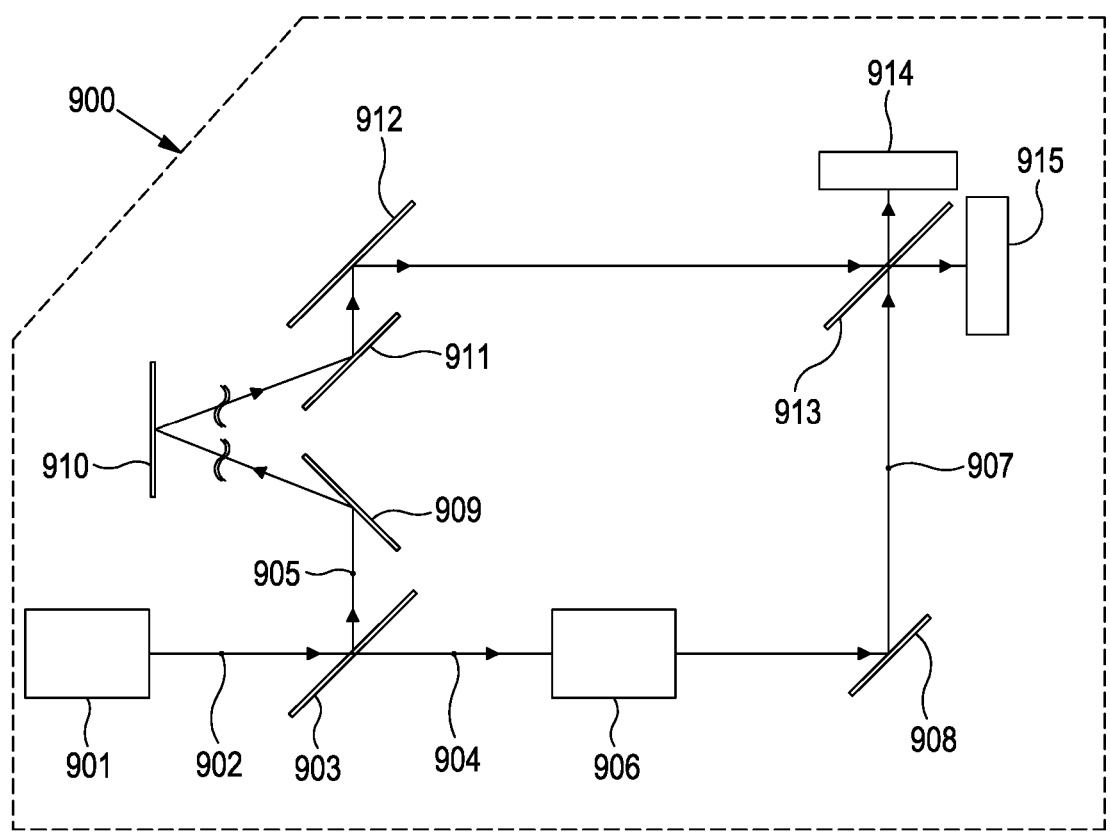
FIG. 9 illustrates another example of an interferometry apparatus.

FIG. 9 illustrates an example of a Mach-Zehnder interferometer 900. The Mach-Zehnder interferometer 900 comprises a laser source 901 operable to emit a first light beam 902. A first beam splitter 903 splits the first light beam 902 into an object beam 905 and a reference beam 904.

The object beam 905 is directed by a first object beam mirror 909 towards a target 910 located a distance from the mirror 909. The object beam 905 is reflected by the target and directed via a second object beam mirror 911 and a third object beam mirror 912 towards a second beam splitter 913.

The reference beam 904 passes through an adaptive delay line 906. The adaptive delay line 906 may, for example, be any of the adaptive delay lines described herein. The adaptive delay line 906 produces a length-adjusted reference beam 907 or a plurality of adapted reference beams, which is/are directed by a reference beam mirror 908 to the second beam splitter 913.

A first photodetector 914 and a second photodetector 915 are arranged to detect interference between the object beam 905 and the length-adjusted reference beam 907 or the plurality of length-adjusted reference beams.

Alternatively, the adaptive delay line 906 could be disposed within an object beam arm of the interferometer 900 rather than within a reference beam arm of the interferometer 900. In such an arrangement, the adaptive delay line 906 would produce adapted length-adjusted object beam or a plurality of length-adjusted object beams.

Figure 10:
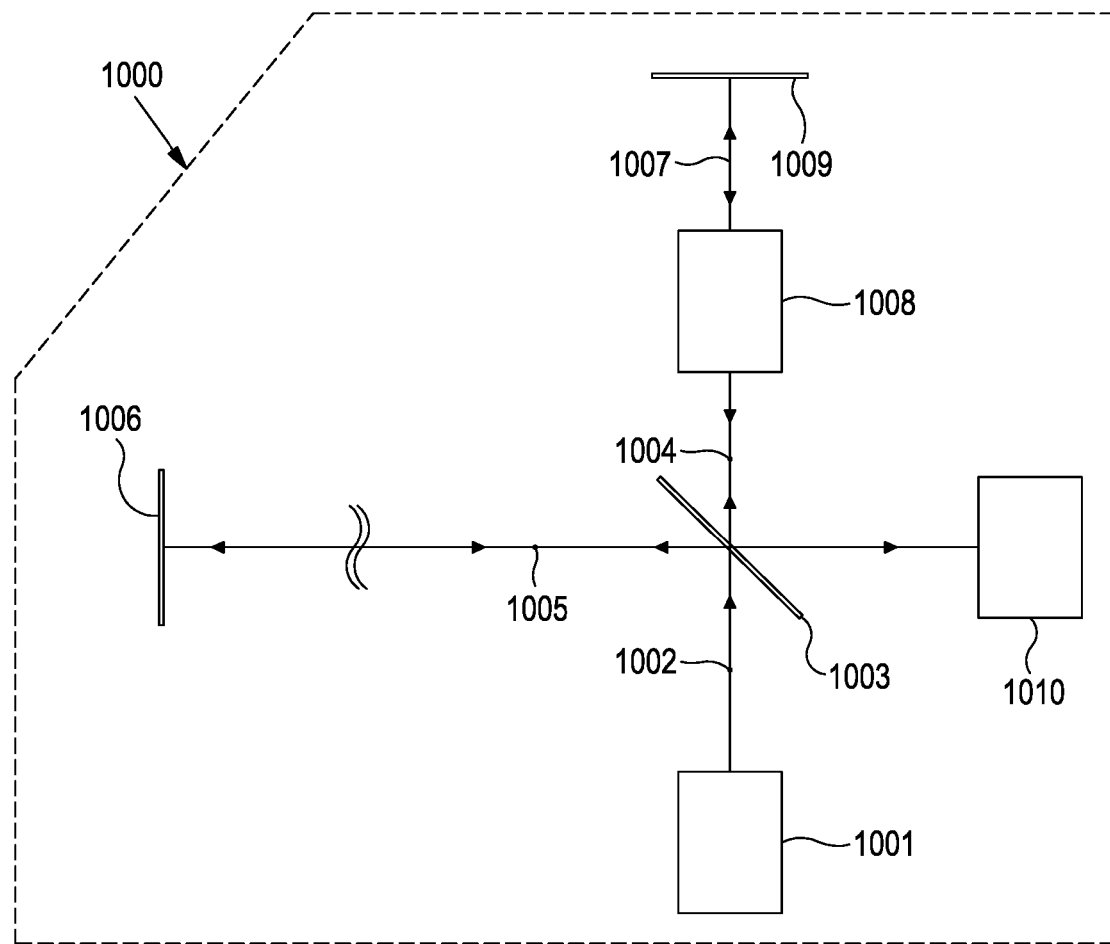
FIG. 10 illustrates another example of an interferometry apparatus.

FIG. 10 illustrates an example of a Michelson interferometer 1000. The interferometer 1000 comprises a laser source 1001 operable to emit a first light beam 1002. A beam splitter 1003 splits the first light beam 1002 into an object beam 1005 and a reference beam 1004.

The object beam 1005 is incident on a target 1006 located a distance from the beam splitter 1003 and is reflected back to the beam splitter 1003.

The reference beam 1004 passes through an adaptive delay line 1008. The adaptive delay line 1008 may, for example, be any of the adaptive delay lines described herein. The adaptive delay line 1008 produces a length-adjusted reference beam 1007 or a plurality of length-adjusted reference beams, which is/are directed by a reference beam mirror 1009 back through the adaptive delay line 1008 to the beam splitter 1003. After passing back through the adaptive delay line 1008, the length-adjusted reference beam or a plurality of length-adjusted reference beams 1007 constitute a doubly-length-adjusted reference beam or a plurality of doubly-length-adjusted reference beams.

A photodetector 1010 is arranged to detect interference between the object beam 1005 and the doubly-length-adjusted reference beam or the plurality of doubly-length-adjusted reference beams.

Alternatively, the adaptive delay line 1008 could be disposed within an object beam arm of the interferometer 1000 rather than within a reference beam arm of the interferometer 1000. In such an arrangement, the adaptive delay line 1008 would produce a length-adjusted object beam or a plurality of length-adjusted object beams.

The teaching of the present disclosure may be used, for example, in the aerospace industry, e.g. for aligning wing components. Another potential area of application may be in the automotive industry, e.g. in collision avoidance for driverless cars. Another potential area of application may be the general machine tool sector. Another potential area of application may be the medical diagnostics sector, e.g. for sub-surface retinal imaging. Another area of application may be measurement of vibration through the measurement of phase or frequency of the Doppler-shifted object beam reflected or scattered from the target. Another area of application may be measurement of long distances for terrain surveying purposes. It is envisaged that there may be many more potential applications, e.g. in the automotive sector and quality control, since the teaching of the present disclosure may enable measurement speeds to be increased while maintaining measurement accuracy at the tens of microns level or better.

Current commercial systems, manufactured by Nikon® for example, typically can achieve up to 1,000 measurement points per second (co-ordinates per second). A new generation of VCSEL technology offers the potential to achieve 100,000 to 500,000 co-ordinates per second. A significant barrier to harnessing this potential comes about because the required sampling rate also increases in proportion, and suitable data acquisition systems, capable of sampling rates above 1 billion samples per second, are prohibitively expensive.

By utilising an adaptive delay line as disclosed herein, this problem may be overcome. The adaptive delay line, which may constitute a module including a series of optical switches that allows the light (reference beam) to be routed along a path so as to closely match the optical paths of the object beam arm and the reference beam arm of the interferometer, acts to reduce the (sampling) frequency to a level that can be measured by more affordable, e.g. low-cost, data acquisition systems. For a given data acquisition system, each additional switch (or divider or etalon spacing) in the adaptive delay line doubles the maximum coordinate measurement rate that can be achieved by the overall interferometry system.

Thus, it will be appreciated that the present disclosure may facilitate the use of advanced laser technologies, e.g. VCSEL or FDML technology, within an interferometry apparatus for measuring distance.

In addition to large volume metrology applications such as those mentioned in the previous paragraphs, the teaching of the present disclosure may be used for very small scale measurements using a technique called Coherence Scanning Interferometry (CSI). The use of an adaptive delay line as disclosed herein might allow, for example, an all-solid-state high-speed CSI system to be built. Such a system would avoid problems of vibration inherent in current mechanically-scanned systems.

The above embodiments are described by way of example only. Many variations are possible without departing from the invention.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

REFERENCES

Klein, T., & Huber, R. (2017). High-speed OCT light sources and systems [Invited]. Biomedical Optics Express, 8(2), 828. https://doi.org/10.1364/BOE.8.000828

Grulkowski, I., Liu, J. J., Potsaid, B., Jayaraman, V., Jiang, J., Fujimoto, J. G., & Cable, a E. (2013). High-precision, high-accuracy ultralong-range swept-source optical coherence tomography using vertical cavity surface emitting laser light source. Opt Lett, 38(5), 673-675. https://doi.org/10.1364/OL.38.000673

Piracha, M. U., Nguyen, D., Ozdur, I., & Delfyett, P. J. (2011). Simultaneous ranging and velocimetry of fast moving targets using oppositely chirped pulses from a mode-locked laser. Optics Express, 19(12), 11213. https://doi.org/10.1364/oe.19.011213

Kim, T., Bhargava, P., & Stojanovié, V. (2018). Overcoming the Coherence Distance Barrier in Long-Range FMCW LIDAR. Conference on Lasers and Electro-Optics (CLEO), (3), STh3L.7. https://doi.org/10.1364/cleo_si.2018.sth31.7

Sandborn, P. A. M., Hariyama, T., & Wu, M. (2017). Resolution-Enhancement for Wide-Range Non-Linear FMCW Lidar using Quasi-Synchronous Resampling. 2017, 2016-2018. https://doi.org/10.1364/3D.2017.DW3F.3

Barber, Z. W., Babbitt, W. R., Kaylor, B., Reibel, R. R., & Roos, P. A. (2010). Accuracy of active chirp linearization for broadband frequency modulated continuous wave ladar. Applied Optics, 49(2), 213-219. https://doi.org/10.1364/AO.49.000213

Deng, K. L., Kang, K. Il, Glask, I., & Prucnal, P. (1997). A 1024-channel fast tunable delay line for ultrafast all-optical TDM networks. IEEE Photonics Technology Letters, 9(11), 1496-1498. https://doi.org/10.1109/68.634720

Takiguchi, K., Itoh, M., & Takahashi, H. (2005). Integrated-optic variable delay line and its application to a low-coherence reflectometer. Optics Letters, 30(20), 2739. https://doi.org/10.1364/ol.30.002739

Kita, D. M., Lin, H., Agarwal, A., Richardson, K., Luzinov, I., Gu, T., & Hu, J. (2017). On-Chip Infrared Spectroscopic Sensing: Redefining the Benefits of Scaling. IEEE Journal of Selected Topics in Quantum Electronics, 23(2), 340-349. https://doi.org/10.1109/JSTQE.2016.2609142

Mateo, A. B., & Barber, Z. W. (2015). Precision and accuracy testing of FMCW ladar-based length metrology. Applied Optics, 54(19), 6019-6024. https://doi.org/10.1364/AO.54.006019

Vossiek, M., Heide, P., Nalezinski, M., & Mágori, V. (1996). Novel FMCW radar system concept with adaptive compensation of phase errors. 1996 26th European Microwave Conference, EuMC 1996, 1(Sep.), 135-139. https://doi.org/10.1109/EUMA.1996.337536

Zhang, X., Pouls, J., & Wu, M. C. (2019). Laser frequency sweep linearization by iterative learning pre-distortion for FMCW LiDAR. Optics Express, 27(7), 9965. https://doi.org/10.1364/oe.27.009965

Huntley, J. M. (1986). An image processing system for the analysis of speckle photographs. Journal of Physics E: Scientific Instruments, 19(1), 43-49. https://doi.org/10.1088/0022-3735/19/1/007

Kakuma, S. (2015). Frequency scanning interferometry with nanometer precision using a vertical-cavity surface-emitting laser diode under scanning speed control. Optical Review, 22(6), 869-874. https://doi.org/10.1007/s10043-015-0140-3

The invention claimed is:

1. An interferometry apparatus comprising:
a laser source operable to emit a first light beam;
a beam splitter arranged to split the first light beam into an object beam and a reference beam, the object beam passing along an object beam arm and the reference beam passing along a reference beam arm;
an adaptive delay line located a distance along the reference beam arm, the adaptive delay line being configured to provide, in use, one or more length-adjusted reference beams;
a beam splitter arranged to recombine the object beam from the object beam arm and the length-adjusted reference beam(s) from the reference beam arm; and
a photodetector operable to detect interference between the object beam and the length-adjusted reference beam(s),
wherein the adaptive delay line comprises one or more etalons, wherein the reference beam enters one of the etalons and is split into a plurality of length-adjusted reference beams, whereby the adaptive delay line operates, in use, to provide a plurality of length-adjusted reference beams.

2. The interferometry apparatus according to claim 1, wherein the adaptive delay line comprises a series of N switches, where N≥1, to allow the selection of one of $2^N$ spaced optical path lengths, and a combiner, whereby the adaptive delay line operates, in use, to provide a length-adjusted reference beam.

3. The interferometry apparatus according to claim 2, wherein one or more of the optical path lengths selectable by operation of the switch(es) within the adaptive delay line is/are adjustable in length.

4. The interferometry apparatus according to claim 2, wherein the optical path length selectable by operation of each one of the switches within the adaptive delay line is unique.

5. The interferometry apparatus according to claim 2, wherein the adaptive delay line is configured such that the reference beam or the object beam passes through a series of N switchable delay lines, with exponentially-growing delays.

6. The interferometry apparatus according to claim 2, wherein the $2^N$ spaced optical path lengths is/are equally or unequally spaced.

7. The interferometry apparatus according to claim 1, wherein the adaptive delay line comprises a series of N dividers, to provide simultaneously $2^N$ reference beams with spaced optical path lengths, where N≥1, and a combiner, whereby the adaptive delay line operates, in use, to provide a plurality of length-adjusted reference beams.

8. The interferometry apparatus according to claim 1, wherein the beam splitter arranged to split the first light beam into an object beam and a reference beam and the beam splitter arranged to recombine the object beam and the adapted reference beam is the same beam splitter.

9. The interferometry apparatus according to claim 1, wherein the beam splitter arranged to split the first light beam into an object beam and a reference beam and the beam splitter arranged to recombine the object beam and the adapted reference beam are different beam splitters.

10. The interferometry apparatus according to claim 9 including: a first beam splitter arranged to split the first light beam into an object beam and a reference beam; a second beam splitter located a distance along the object beam arm, the second beam splitter being arranged to split a target-incident beam from the object beam; and a third beam splitter arranged to recombine the object beam and the adapted reference beam.

11. The interferometry apparatus according to claim 1, wherein the laser source is a tunable laser source.

12. The interferometry apparatus according to claim 1 comprising a data logger operable to receive and log data from the photodetector.

13. An interferometry apparatus comprising:
a laser source operable to emit a first light beam;
a beam splitter arranged to split the first light beam into an object beam and a reference beam, the object beam passing along an object beam arm and the reference beam passing along a reference beam arm;
an adaptive delay line located a distance along the object beam arm, the adaptive delay line being configured to provide, in use, one or more length-adjusted object beams;
a beam splitter arranged to recombine the length-adjusted object beam(s) from the object beam arm and the reference beams from the reference beam arm; and
a photodetector operable to detect interference between the length-adjusted object beam(s) and the reference beam;
wherein the adaptive delay line comprises one or more etalons, wherein the object beam enters one of the etalons and is split into a plurality of length-adjusted object beams, whereby the adaptive delay line operates, in use, to provide a plurality of length-adjusted object beams.

14. The interferometry apparatus according to claim 13, wherein the adaptive delay line comprises a series of N switches, where N≥1, to allow the selection of one of $2^N$ spaced optical path lengths, and a combiner, whereby the adaptive delay line operates, in use, to provide a length-adjusted object beam.

15. The interferometry apparatus according to claim 14, wherein one or more of the optical path lengths selectable by operation of the switch(es) within the adaptive delay line is/are adjustable in length.

16. The interferometry apparatus according to claim 14, wherein the optical path length selectable by operation of each one of the switches within the adaptive delay line is unique.

17. The interferometry apparatus according to claim 14, wherein the adaptive delay line is configured such that the reference beam or the object beam passes through a series of N switchable delay lines, with exponentially-growing delays.

18. The interferometry apparatus according to claim 14, wherein the $2^N$ spaced optical path lengths is/are equally or unequally spaced.

19. The interferometry apparatus according to claim 13, wherein the adaptive delay line comprises a series of N dividers, to provide simultaneously $2^N$ object beams with spaced optical path lengths, where N≥1, and a combiner, whereby the adaptive delay line operates, in use, to provide a plurality of length-adjusted object beams.

20. An adaptive delay line module adapted for installation in a reference beam arm of an interferometry apparatus, wherein the adaptive delay line module comprises an adaptive delay line configured to provide, in use, one or more length-adjusted reference beams or an adaptive delay line module adapted for installation in an object beam arm of an interferometry apparatus, wherein the adaptive delay line module comprises an adaptive delay line configured to provide, in use, one or more length-adjusted object beams, wherein the adaptive delay line comprises one or more etalons, wherein the reference or object beam enters one of the etalons and is split into a plurality of length-adjusted reference or object beams, whereby the adaptive delay line operates, in use, to provide a plurality of length-adjusted reference or object beams.

21. A method of measuring distance using an interferometry apparatus comprising:
operating a laser to provide a first light beam;
splitting the first light beam into an object beam and a reference beam, the object beam passing along an object beam arm of the interferometry apparatus and the reference beam passing along a reference beam arm of the interferometry apparatus;
providing an adaptive delay line located a distance along the reference beam arm, the adaptive delay line being configured to provide one or more length-adjusted reference beams, thereby adjusting an optical path difference in the interferometry apparatus;

recombining the object beam from the object beam arm and the length-adjusted reference beam(s) from the reference beam arm; and detecting interference between the object beam and the length-adjusted reference beam(s), wherein the adaptive delay line comprises one or more etalons, wherein the reference beam enters one of the etalons and is split into a plurality of length-adjusted reference beams, whereby the adaptive delay line operates, in use, to provide a plurality of length-adjusted reference beams.

22. A method of measuring distance using an interferometry apparatus comprising:

operating a laser to provide a first light beam;

splitting the first light beam into an object beam and a reference beam, the object beam passing along an object beam arm of the interferometry apparatus and the reference beam passing along a reference beam arm of the interferometry apparatus;

providing an adaptive delay line located a distance along the object beam arm, the adaptive delay line being configured to provide one or more length-adjusted object beams, thereby adjusting an optical path difference in the interferometry apparatus;

recombining the length-adjusted object beam(s) from the object beam arm and the reference beam from the reference beam arm; and detecting interference between the length adjusted object beam(s) and the reference beam, wherein the adaptive delay line comprises one or more etalons, wherein the object beam enters one of the etalons and is split into a plurality of length-adjusted object beams, whereby the adaptive delay line operates, in use, to provide a plurality of length-adjusted object beams.

* * * * *